United States Patent
Kang (10) Patent No.: US 7,301,673 B2
(45) Date of Patent: Nov. 27, 2007

(54) ERROR DIFFUSION PROCESSING METHOD

(75) Inventor: Ki-min Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1080 days.

(21) Appl. No.: 10/199,003

(22) Filed: Jul. 22, 2002

(65) Prior Publication Data

US 2003/0107769 A1 Jun. 12, 2003

(30) Foreign Application Priority Data

Dec. 6, 2001 (KR) .............................. 2001-76983

(51) Int. Cl.
*H04N 1/40* (2006.01)
*G06K 9/36* (2006.01)
(52) U.S. Cl. .................... 358/3.03; 358/3.18; 358/534; 382/252; 345/616
(58) Field of Classification Search ................ 358/1.9, 358/3.03–3.06, 3.13, 534–536, 237, 3.22, 358/3.18, 465, 3.28; 382/298, 270, 299, 382/252, 100, 151; 345/616
See application file for complete search history.

(56) References Cited

U.S. PATENT DOCUMENTS 5,526,445 A * 6/1996 Smutek et al. .............. 382/237
5,535,019 A   7/1996 Eschbach
6,160,921 A * 12/2000 Marcu ......................... 382/252
6,738,505 B1 * 5/2004 Prince ........................ 382/150
7,081,972 B2 * 7/2006 Fukao ........................ 358/3.04

FOREIGN PATENT DOCUMENTS

KR    10-1999-53325    6/2001

* cited by examiner

*Primary Examiner*—King Y. Poon
*Assistant Examiner*—Steven Kau
(74) *Attorney, Agent, or Firm*—Staas & Halsey LLP

(57) ABSTRACT

An error diffusion processing method includes determining a binary value of an input pixel according to a grayscale level of the input pixel, searching a nearest pixel that has the same binary value as the input pixel, and comparing a measured actual distance with an ideal distance between the two pixels, so as to compute a first adjustment value. By applying a noise array to an input image, a second adjustment value is also computed according to a noise value of the input pixel. Based on the first and second adjustment values, a threshold is adjusted to determine the binary value of the input pixel. The adjusted threshold is compared with the grayscale level of the input pixel, and according to the comparison result, the binary value of the input pixel is determined. By diffusing an error value, which is a difference between the grayscale level and the determined binary value of the input pixel, to neighboring pixels, the grayscale level of the neighboring pixels is changed. A third adjustment value is also applied to reduce a diagonal pattern due to binarization of the input pixel, while encouraging a perpendicular pattern.

20 Claims, 7 Drawing Sheets

| (0,0) | (1,0) | (2,0) | • | • | • | • |
|---|---|---|---|---|---|---|
| (0,1) | (1,1) | (2,1) | • | • | • | • |
| (0,2) | (1,2) | (2,2) | • | • | • | • |
| • | • | • | (m-1, n-1) | (m, n-1) | (m+1, n-1) | • |
| • | • | • | (m-1, n) | (m,n) | (m+1, n) | • |
| • | • | • | • | • | • | • |

ERROR DIFFUSION PROCESSING METHOD

CROSS-REFERENCE TO RELATED APPLICATIONS

This application claims the benefit of Korean Patent Application No. 2001-76983 filed on Dec. 6, 2001, in the Korean Industrial Property Office, the disclosure of which is incorporated herein by reference.

BACKGROUND OF THE INVENTION

1. Field of the Invention

The present invention relates to a halftoning operation that converts an input pixel image into a binary image, and more particularly, to an error diffusion processing method that improves an image quality by influencing an error value between a grayscale level of an input pixel and a binary result thereof to neighboring pixels that are to be processed.

2. Description of the Related Art

Generally, binary output devices, such as digital printers, copiers and binary outputting Liquid Crystal Devices (LCDs), deliver chromatic images in black and white. The black and white digital printer, for example, prints an image of various degrees of brightness on a monitor with just two values, i.e., black and white. In order to print the black and white image of various degrees of brightness in the monitor onto a paper, the printer or a personal computer (PC) performs a series of operations to convert an input image into a binary image.

That is, the printer converts the color of each pixel into an image of grayscale level ranging from 0 to 255, and then converts the grayscale image into the binary image. The image of brightness within 0 (Black)~255 (White) is called the grayscale image, and the operation of converting the grayscale image into the binary image is called 'halftoning.' There are various methods of halftoning including an error diffusion processing method.

Figure 1:
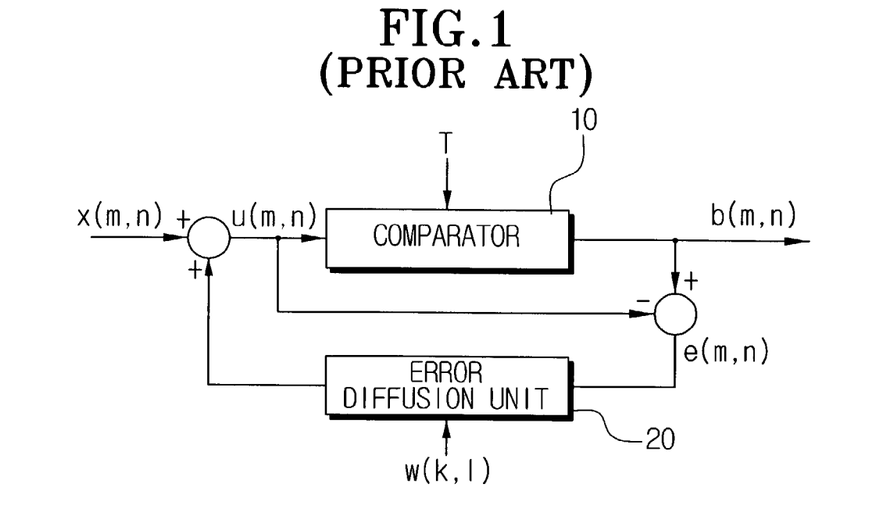
FIG. 1 is a block diagram of a conventional binary output device employing the Floyd-Steinberg error diffusion processing method.

FIG. 1 shows a conventional binary output device with an error diffusion processing method suggested by Messrs. Floyd and Steinberg. In FIG. 1, 'x(m, n)' denotes an input pixel of a grayscale image ("a grayscale level of the input image"), and 'b(m, n)' is a binary result of the input pixel. The reference 'e(m, n)' denotes an error value, which is a difference between the grayscale level 'x(m, n)' and the binary result of the input pixel 'b(m, n),' and 'u(m, n)' is a corrected grayscale level that is obtained by converting an input pixel value based on the error value 'e(m, n).'

The error value 'e(m, n)' is diffused to neighboring pixels according to an error diffusion coefficient 'w(k, l)' of the input pixel value, and the converted grayscale level 'u(m, n)' is compared with a fixed threshold 'T' to be determined as a binary value of either black or white. More specifically, where the corrected grayscale level 'u(m, n)' is greater than the threshold 'T,' a white dot is generated. A black dot is generated where the corrected grayscale 'u(m, n)' is less than the threshold 'T.' As all of the pixels undergo the above operation, the input grayscale image is converted into the binary image. The error diffusion value 'u(m,n)' is obtained by the following equation 1:

$$u(m, n) = x(m, n) + \sum_{(k,l) \in R} W(m-k, n-1)e(m, n) \quad <\text{Equation 1}>$$

where 'W(m-k, n-1)' is a set of neighboring pixels for error diffusion, the e(m, n)=u(m,n)-b(m, n), and the 'b(m, n)' is '255' if the 'u(m, n)' is above the threshold 'T,' while it becomes '0' in the other cases.

The above Floyd-Steinberg error diffusion processing method, however, has visual artifacts due to uneven distribution of dots in a region where black dots or white dots have to be clearly shown. Two suggestions were made to overcome the problem of the Floyd-Steinberg error diffusion processing method. One is to re-define the error diffusion coefficient 'w(m, n),' and the other is to change the fixed value of the binary threshold 'T.'

Re-defining the error diffusion coefficient 'w(m, n)' achieves some reduction of the visual artifacts as the error diffusion coefficient 'w(m, n)' is increased. However, as the error diffusion coefficient increases 'w(m, n),' more memory is required to binarize the image, and more computation time is required.

A method of changing a binary threshold can be found in an error distribution through the binary threshold conversion in Eschbach (U.S. Pat. No. 5,535,109), and a roadmap using the method disclosed in Marcu (U.S. Pat. No. 6,160,921), the disclosures of which are incorporated herein by reference.

Similar to the operation of changing grayscale levels of neighboring pixels by diffusing a binary error value to the neighboring pixels, Eschbach diffuses a function of a trace of binarization to neighboring pixels, and converts a binary threshold in the binarization of the neighboring pixels. For an even distribution of black dots or white dots, the binary threshold is adjusted so as to have the neighboring pixels generate a black dot or a white dot according to a grayscale level of an input pixel and the result of the binarization.

Eschbach '109 generates a binarized image of the black dots or the white dots that is more evenly distributed than the Floyd-Steinberg error diffusion processing method. However, the problem of Eschbach is that it has a blank region, in which the black dots are not shown, at the borderline of a bright region of the binarized image. Also, due to a complicated computational operation for obtaining the binary threshold, the processing speed is decreased.

Meanwhile, Marcu '921 binarizes an input image of a grayscale level by using two methods. That is, after setting a range of the grayscale levels for regions where the even distribution of dots is critical, e.g., in a bright grayscale region and a dark grayscale region, an input pixel having the grayscale level within the set range undergoes the binarization by using a roadmap. For the input pixel of an intermediate grayscale level, the Floyd-Steinberg error diffusion processing method is applied. In other words, according to Marcu '921, after determining the relative positions of the a black or white dots according to the brightness of the input image (for an even distribution), a binarization into black or white dot is carried out according to a predetermined relative position without referring to a binary threshold. Accordingly, Marcu '921 requires more memory to store the positions of the black and white dots for determining the relative positions of the black and white dots.

Although the error diffusion processing methods of Eschbach '109 and Marcu '921 have relatively more even distribution of the black dots and the white dots in the bright and dark regions, they cannot improve the print quality of a printout since these methods cannot solve the problem of annoying patterns being generated in the intermediate grayscale region of the input image.

To solve the above problems, Kang et al. (Korean Patent No. 99-53325), the disclosure of which is incorporated herein by reference, suggests an error diffusion processing method using a distance restriction that is capable of reducing the annoying patterns in bright and dark regions, and even in an intermediate grayscale level region. The error diffusion processing method, using the distance restriction, presets an ideal distance between black dots in the bright region and between white dots in the dark region, and adjusts a threshold to maintain the actual distance measured between the black dots and the white dots at the ideal distance.

However, the error diffusion processing method using the distance restriction cannot match the actual distance to the ideal distance due to the location of the dots in a binary output in a cross pattern. Accordingly, even though there are some improvements over the error diffusion processing methods of Floyd-Steinberg, Eschbach '109 and Marcu '921, in terms of the image quality, the annoying patterns are still present in certain regions.

Furthermore, a binary output device, for example, an inkjet printer, is designed to print an image through nozzles in repeated horizontal movements. Accordingly, when a pattern shaped like a worm ('worm' pattern) occurs in a diagonal direction in a binary output image, a 'bending phenomenon' occurs such that black dots are improperly printed as the position of the nozzles in each print unit changes in a horizontal direction.

SUMMARY OF THE INVENTION

Accordingly, it is an object of the present invention to provide an improved error diffusion processing method capable of achieving a perpendicular pattern without causing a diagonal pattern to show, and to reduce the occurrence of any annoying pattern in certain regions.

Additional objects and advantages of the invention will be set forth in part in the description which follows and, in part, will be obvious from the description, or may be learned by practice of the invention.

To achieve the above and other objects of the present invention, there is provided an error diffusion processing method of processing an input pixel of an input image, the method comprising predicting a type of a dot according to a gray level of the input pixel to be processed, searching for a nearest pixel having a dot of the same type as the dot of the input pixel and is nearest to the input pixel, computing a first adjustment value of a threshold according to a difference between a measured distance between the input and nearest pixels, and an ideal distance between the input and nearest pixels, wherein the ideal distance is preset according to the gray level, computing a second adjustment value of the threshold according to a noise value of the input pixel by applying a noise array to the input image, adjusting the threshold based on the first and the second adjustment values to determine a binary value of the input pixel, determining the binary value of the input pixel by comparing the gray level of the input pixel and the threshold, and changing the gray level of neighboring pixels by diffusing an error value, which is obtained between the gray level of the input pixel and the determined binary value of the input pixel, to the neighboring pixels according to an error distribution coefficient.

According to an aspect of the present invention, the computing of the first adjustment value comprises calculating the measured distance between the input pixel and the nearest pixel having the same dot as the input pixel based on location values of the input and nearest pixels, obtaining the ideal distance between the input and nearest pixels by referencing a lookup table which stores the ideal distance between the input and nearest pixels according to the grayscale level, comparing the obtained ideal distance with the measured distance between the input and nearest pixels, and calculating the first adjustment value according to a weight value based on the comparing of the obtained ideal distance with the measured distance.

According to another aspect of the present invention, the computing of the second adjustment value comprises dividing the input image into a plurality of regions corresponding to a size of the noise array, detecting the noise value corresponding to the input pixel from the noise array of the region containing the input pixel and a nearest noise value of the nearest pixel having the same dot as the input pixel, and computing the second adjustment value according to a difference between the noise values of the input and nearest pixels.

According to yet another aspect of the present invention, the error diffusion processing method further comprises computing a third adjustment value to avoid a diagonal pattern, in response to the nearest pixel having the same dot as the input pixel existing on a diagonal line according to the gray level of the input pixel. The threshold is further adjusted based on the third adjustment value.

The error diffusion processing method according to the present invention can have an even distribution of a binary output through a distance restriction with respect to different types of dots of respective pixels, and also can reduce the occurrence of an annoying pattern by adding irregularity through a noise array. Also, the error diffusion processing method according to the present invention achieves the perpendicular pattern while avoiding the occurrence of a diagonal pattern, and reduces the bending phenomenon of the binary image.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
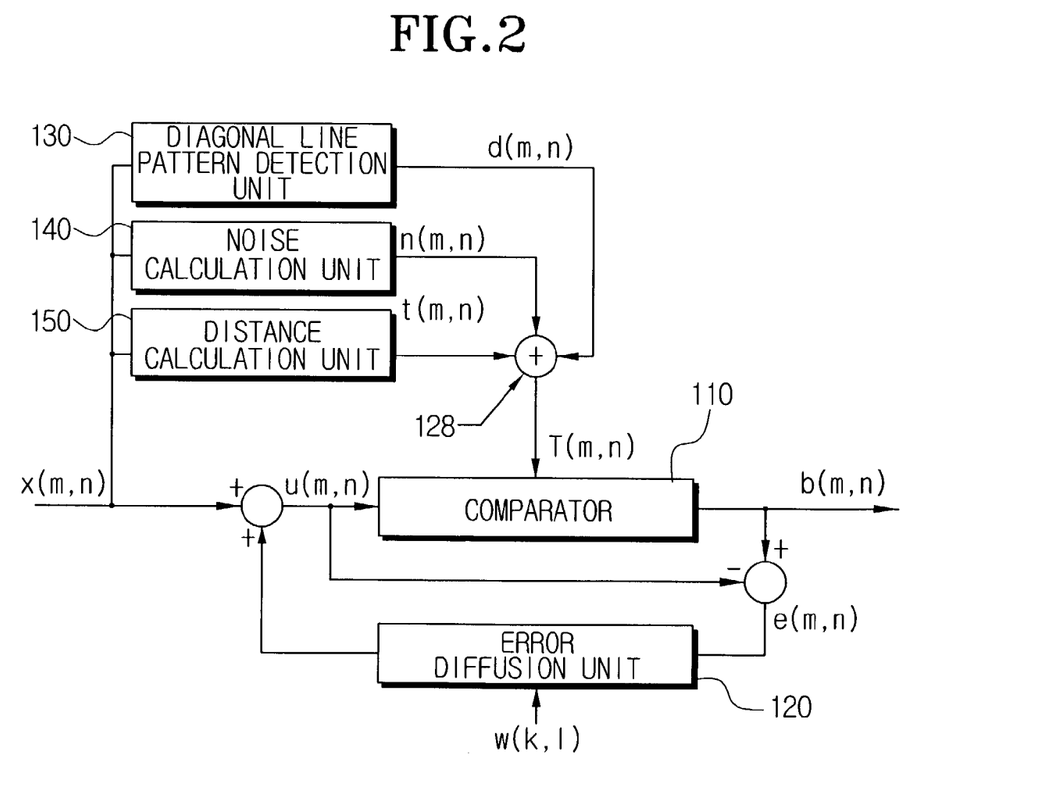
FIG. 2 is a block diagram of a binary output device of the present invention employing an error diffusion processing method according to an embodiment the present invention.

FIG. 2 shows a block diagram of a binary output device of the present invention employing an error diffusion processing method according to an embodiment of the present invention. The binary output device includes a comparator 110, an error diffusion unit 120, a distance calculation unit 150, a noise calculation unit 140 and a diagonal pattern detection unit 130.

The comparator 110 compares a grayscale level 'x(m, n)' of an input pixel '(m, n)' of an input image with a threshold 'T(m, n),' and determines a binary value 'b(m, n)' of the input pixel '(m,n).'

The error diffusion unit 120 diffuses an error value 'e(m, n),' which is the difference between the grayscale level 'x(m, n)' of the input pixel and the predetermined binary value 'b(m, n),' to neighboring pixels according to an error diffusion coefficient 'w(k, l).'

A pixel, which is nearest to the input pixel and has the same dot as the dot of the input pixel predicted from the grayscale level 'x(m, n)' of the input pixel, is searched among the pixels that are processed earlier than the input pixel. Then, based on a distance between the input pixel and the searched nearest pixel, the distance calculation unit 150 computes a first adjustment value of the threshold 'T(m, n).'

The noise calculation unit 140 partitions the input image into a plurality of regions, applies a noise array for each region, and obtains a noise value corresponding to the input pixel 'x(m, n).' Also, according to the predicted binary value 'b(m, n)' of the input pixel 'x(m, n),' a pixel, which is nearest to and has the same dot as the input pixel 'x(m, n),' is searched among the pixels that are processed earlier than the input pixel. Then the noise value of the searched nearest pixel is obtained. Accordingly, the noise calculation unit 140 computes the second threshold of the threshold 'T(m, n)' by dividing the difference of the two obtained noise values by a predetermined number.

The diagonal pattern detection unit 130 determines if the input pixel, and the pixel which is nearest to the input pixel and has the same dot as the dot of the input pixel predicted from the grayscale level 'x(m, n)' of the input pixel, are in a diagonal pattern, and computes a third adjustment value of the threshold 'T(m, n)' to avoid a diagonal pattern by the input pixel.

The reference 'x(m, n),' also described herein as the grayscale level, is the input pixel value of a grayscale image, and the reference 'b(m, n)' is the binary result of the input pixel value. The reference 'e(m, n)' refers to a difference, i.e., an error value between the grayscale level 'x(m, n)' and the binary value of the input pixel 'b(m, n),' and the reference w(k, l) refers to the diffusion coefficient according to the error value 'e(m, n).'

The reference 'u(m, n)' is a corrected grayscale level obtained as the input pixel value is converted by the error value 'e(m, n).' That is, 'u(m, n)' is the corrected grayscale level of the neighboring pixels.

The reference 't(m, n)' is the first adjustment value of the threshold 'T(m, n)' computed from the grayscale level 'x(m, n)' of the input pixel by the distance calculation unit 150 to adjust the threshold 'T(m, n).' The reference 'n(m, n)' is the second adjustment value of the threshold 'T(m, n)' computed from the grayscale level 'x(m, n)' of the input pixel by the noise calculation unit 140 to adjust the threshold 'T(m, n).' Finally, the reference 'd(m, n)' is the third adjustment value of the threshold 'T(m, n)' determined from the grayscale level 'x(m, n)' of the input pixel by the diagonal line pattern detection unit 130 to adjust the threshold 'T(m, n).'

In the binary output device as described above, the error value 'e(m, n)' is diffused to the neighboring pixels according to the error diffusion coefficient 'w(k, l)', and the corrected grayscale level 'u(m, n)' is compared with the threshold 'T(m, n)' (binary threshold) adjusted by the first, second, and third adjustment values to determine the binary value 'b(m, n)' of black or white. If the corrected grayscale level 'u(m, n)' is greater than the adjusted threshold 'T(m, n),' the input pixel '(m, n)' is binarized into a white dot. On the other hand, if the corrected grayscale level 'u(m, n)' is equal to, or less than the adjusted threshold 'T(m, n),' the input pixel '(m, n)' is binarized into a black dot. As all of the pixels undergo the above operation, the input grayscale image is converted into a binary image.

Figure 3:
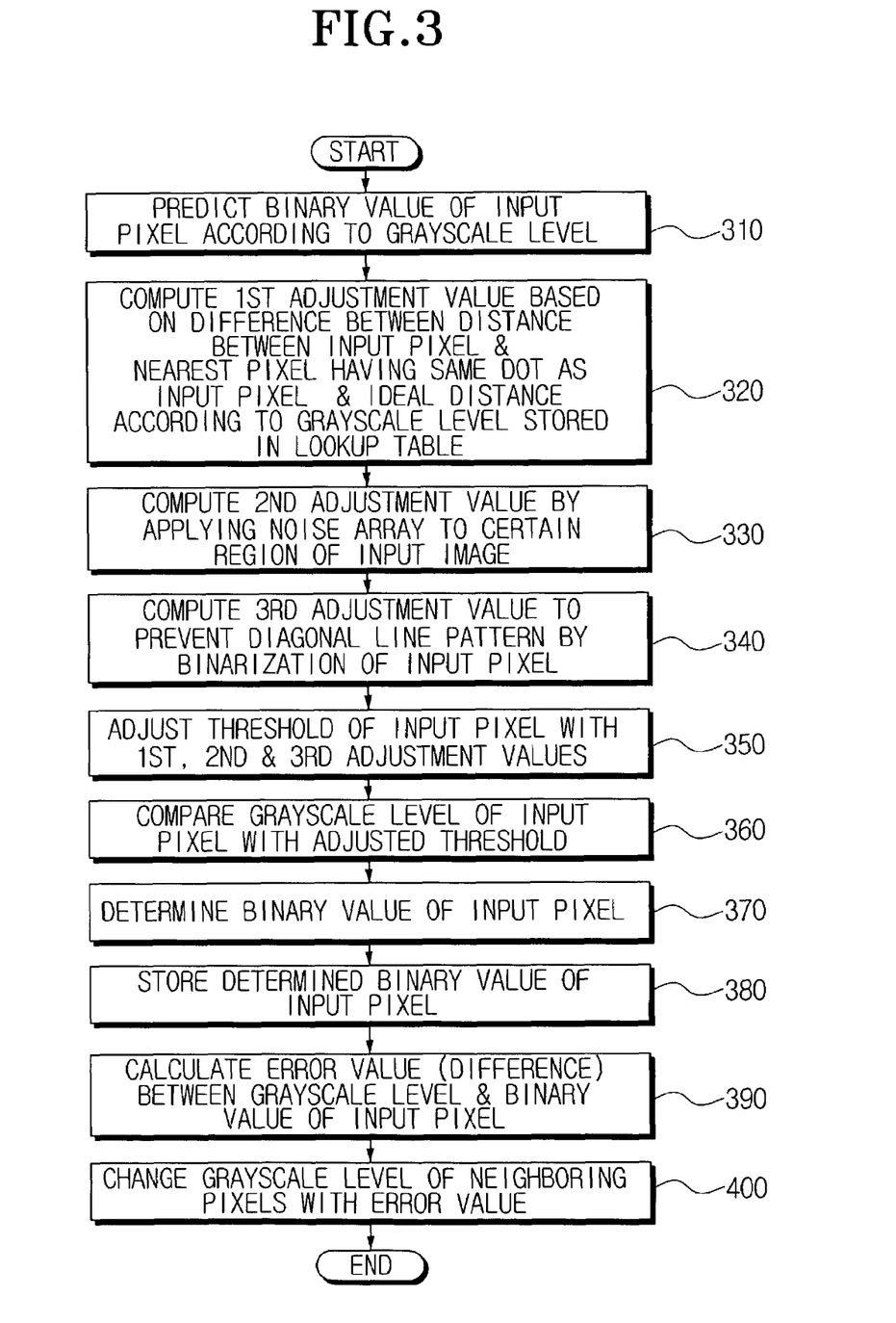
FIG. 3 is a flowchart illustrating principles of the error diffusion processing method according to the present invention.

FIG. 3 shows a flowchart explaining the operation of the binary output device of FIG. 2. For example, where the (m, n)th pixel of the grayscale image is input, the binary output device predicts a binary value of the input pixel from the grayscale level 'x(m, n)' of the input pixel in operation 310. The distance calculation unit 150 measures the distance between the input pixel and a pixel $(m_0, n_0)$ ("nearest pixel") that has the same binary value as the predicted binary value of the input pixel and is nearest to the input pixel. Then the distance calculation unit 150 compares the measured distance with an ideal distance from a pre-set lookup table that stores the ideal distances between the input pixel and the neighboring pixels according to the grayscale level 'x(m, n)' of the input pixel. Based on the comparison, the distance calculation unit 150 computes the first adjustment value 't(m, n)' of the threshold 'T(m, n)' to adjust the binary threshold 'T(m, n)' of the input pixel in operation 320.

The ideal distance '$\lambda_{x(m,n)}$' defined in the lookup table is the reciprocal of an ideal frequency for the binary image. The ideal frequency '$f_p(x(m,n))$' is obtained by the following equation 2:

$$f_p(x(m, n)) = \frac{1}{\sqrt{x(m, n)}} \text{ if } x(m, n) \leq 128 = \frac{1}{\sqrt{1 - \frac{x(m, n)}{255}}} \text{ else} \qquad <\text{Equation 2}>$$

The ideal distance between the input and nearest pixels through the equation 2 is obtained by the following equation 3:

$$\lambda_{x(m,n)} = \frac{1}{f_p x(m, n)} \qquad <\text{Equation 3}>$$

By using the equation 3, the difference between an actual measured distance 'dmin' and the ideal distance '$\lambda_{x(m,n)}$' (hereinafter '$\lambda_x$') is used to compute the first adjustment value 't(m, n)' of the threshold 'T(m, n).' Here, the ideal distance '$\lambda_x$' is obtained from the lookup table that stores the ideal distances between the input and nearest pixels having the same binary value.

The operation of computing the first adjustment value 't(m, n),' by the distance calculation unit 150, is described in detail below with reference to FIGS. 4A and 4B.

Figure 4A:
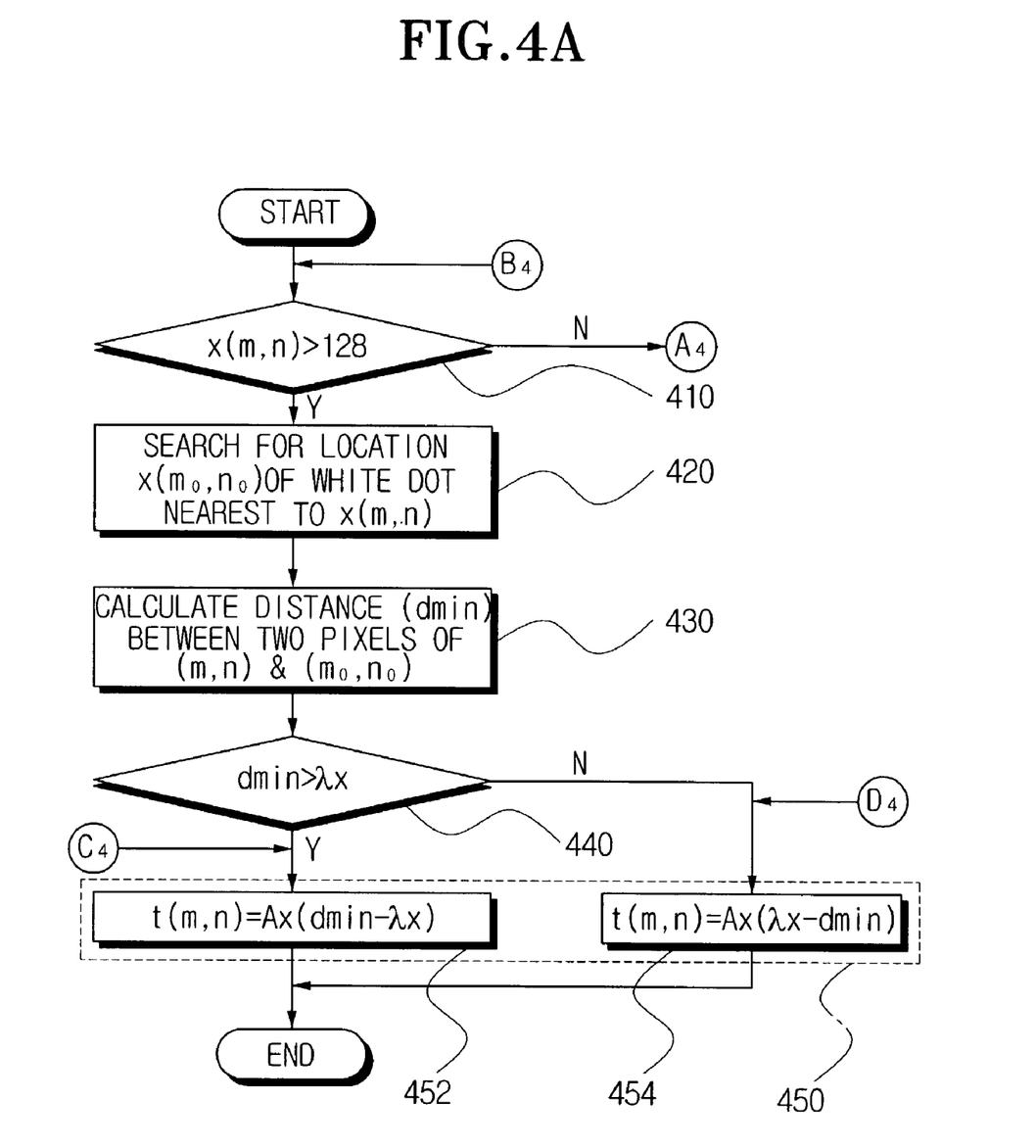
FIGS. 4A and 4B are flowcharts illustrating an operation of computing a first adjustment value of a threshold of FIG. 3.

Referring to FIG. 4A, where the grayscale level 'x(m, n)' of the input pixel is greater than an intermediate grayscale level in operation 410, among detected pixels processed earlier than the input pixel and stored in the lookup table within a certain range, a white dot nearest to the input pixel ("nearest pixel") is searched for in operation 420.

Figure 4B:
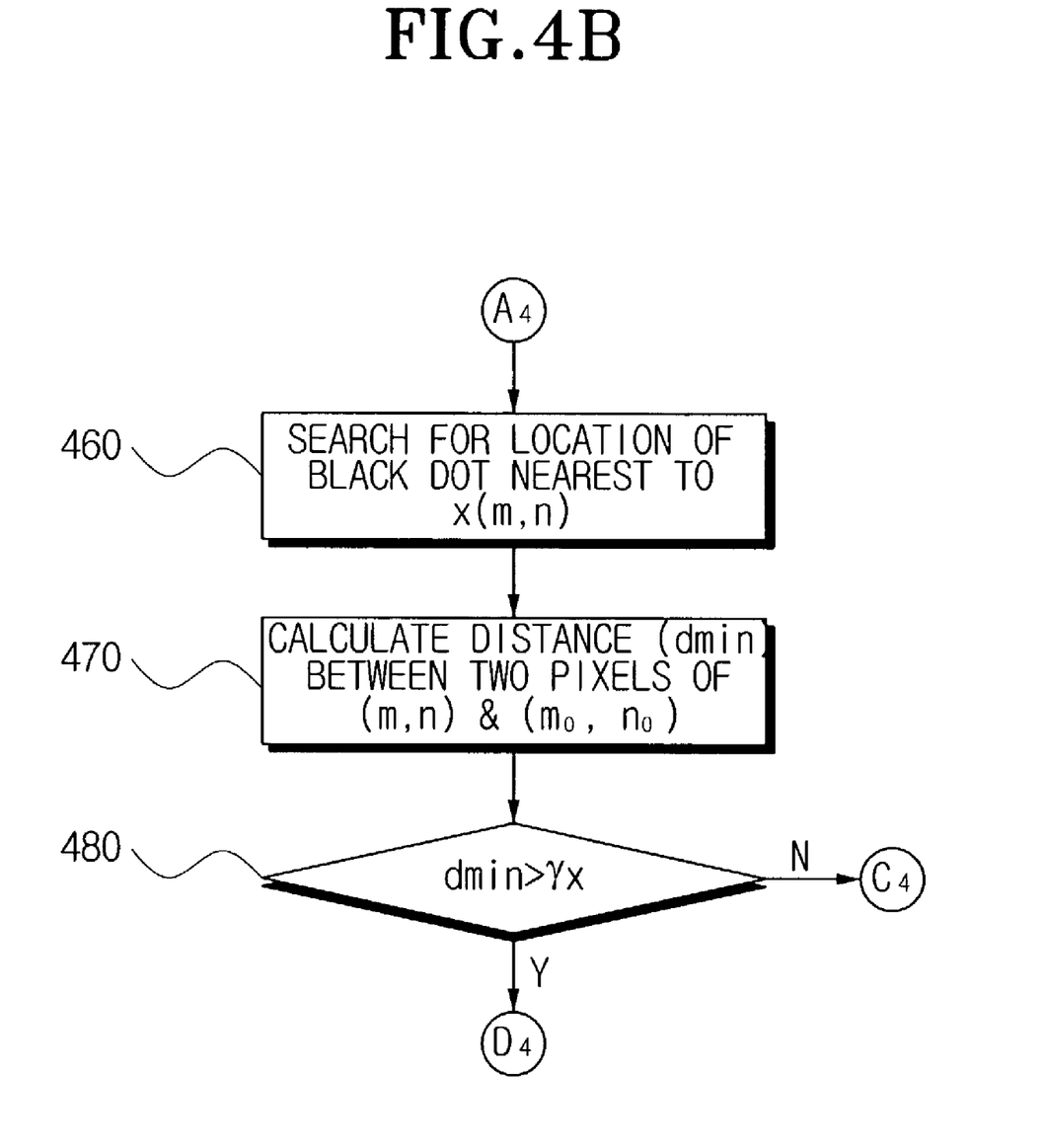

Then the distance 'dmin' between the input pixel and the nearest pixel is calculated in operation 430. Next, the measured distance 'dmin' between the input and nearest pixels and the ideal distance '$\lambda_x$' from the lookup table are compared with each other in operation 440. According to the comparison result, one of the pre-set weights '$A_{x(m,n)}$' (hereinafter '$A_x$') is obtained from the lookup table to compute the first adjustment value 't(m, n)' in operation 450.

Where the measured distance 'dmin' is greater than the ideal distance '$\lambda_x$' in operation the 440, the first adjustment value 't(m, n)' has a positive value in order to induce the (m, n)th pixel to be binarized into a white dot in operation 452. Here, the weight '$A_x$' has the positive value. Where the measured distance 'dimin' is less than the ideal distance '$\lambda_x$' in the operation 440, the first adjustment value 't(m, n)' has a negative value in order to induce the (m, n)th pixel to be binarized into a black dot in operation 454. In this situation, the weight '$A_x$' has a negative value.

Where the grayscale level 'x(m, n)' of the input pixel is equal to, or below the intermediate grayscale level in the operation 410, operations of FIG. 4B are performed.

Accordingly, where the grayscale level 'x(m, n)' of the input pixel is below the intermediate grayscale level in the operation 410, like the operation 420 of FIG. 4A, a black dot nearest to the input pixel is searched for in operation 460. That is, from the position storage lookup table that stores the positions of the pixels processed earlier than the input pixel, a white dot, which is within the predetermined range and nearest to the input pixel is searched for in the operation 460.

Then the distance 'dmin' is calculated between the input pixel '(m, n)' and the nearest pixel from where the black dot is detected in operation 470. Next, the measured distance 'dmin' between the two pixels and the ideal distance '$\lambda_x$' are compared with each other in operation 480. Then, a weight '$A_{x(m,n)}$' is obtained from the lookup table that stores weights '$A_x$' according to the distance difference, to thereby compute the first adjustment value 't(m, n)' in the operation 450 of FIG. 4A. Here, the first adjustment value 't(m, n)' obtained from the comparison between the measured distance 'dmin' and the ideal distance '$\lambda_x$' corresponds to the values obtained when the input pixel is a white dot, but with an opposite sign, respectively. See reference $C_4$ and $D_4$ of FIGS. 4A and 4B.

Through the operation 320 of FIG. 3 of computing the first adjustment value 't(m, n),' the black dots and the white dots are evenly distributed at an ideal distance from each other. However, since the measured distance between the dots in a cross pattern hardly matches with the ideal distance, an image quality deteriorating pattern occurs in an intermediate grayscale level region where the ideal distance is shorter than in other regions. Also, since the black dots and the white dots are evenly distributed in a regular pattern, dots become quite noticeable. In order to solve the problem of deteriorating image quality due to the even distribution of the dots in the regular pattern, the present invention applies a noise array in a certain region of the input image.

Referring back to FIG. 3, after computing the first adjustment value 't(m, n)' in the operation 320, the second adjustment value 'n(m, n)' is computed through the noise compute unit 140 to adjust the threshold 'T(m, n)' by applying the noise array in a certain region of the input image in operation 330. The size of the noise array is, for example, '32×32', and each noise value of the noise array corresponding to each pixel has the value ranging from 1 to 254. The noise values of the noise array are fixed. In other words, there is a noise array corresponding to each region of the input image, respectively.

Figure 5A:
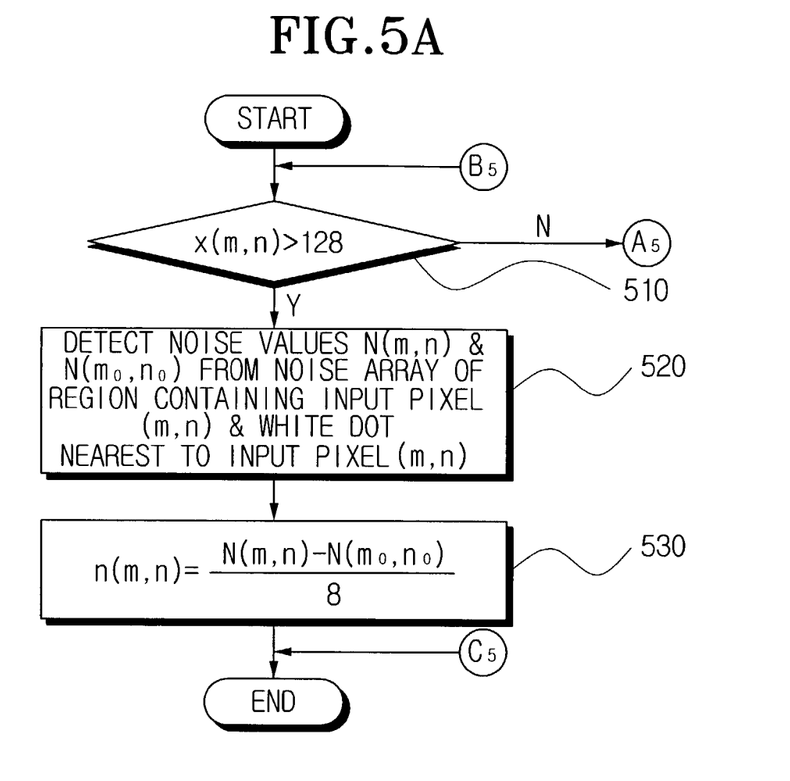
FIGS. 5A and 5B are flowcharts illustrating an operation of computing a second adjustment value of the threshold of FIG. 3.
Figure 5B:
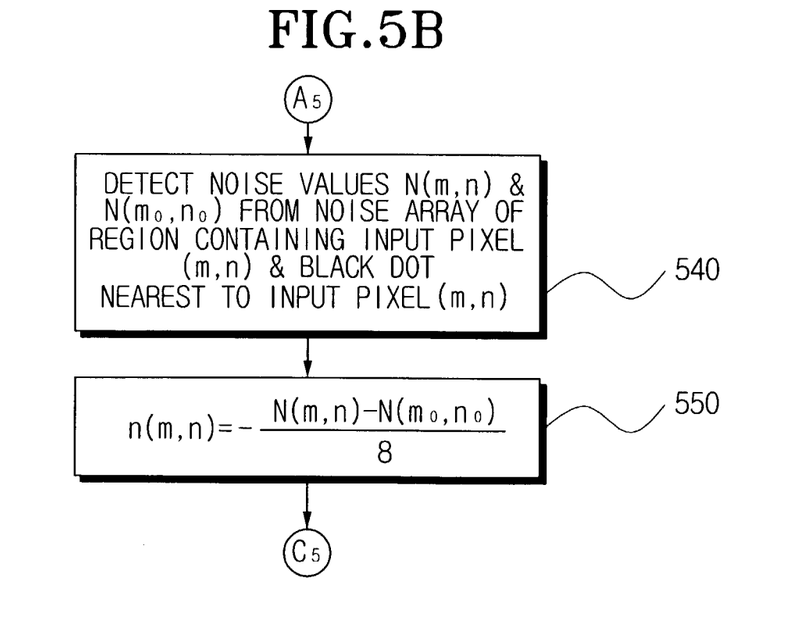

The operation of computing the second adjustment value 'n(m, n)' will be described in detail below with reference to FIGS. 5A and 5B.

Where the grayscale level 'x(m, n)' of the input pixel is above the intermediate grayscale level '128' in operation 510, through the noise array corresponding to the region that contains the input pixel (m, n), a noise value 'N(m, n)' corresponding to the input pixel (m, n) and a noise value '$N(m_0, n_0)$' corresponding to a white dot nearest to the input pixel (m, n) are detected, respectively, in operation 520. The difference between the two detected noise values is obtained and divided by '8,' which is a predetermined number, and determined as a resulting noise value of the input pixel. The resulting noise value is computed as the second adjustment value 'n(m, n)' in operation 530. The second adjustment value is obtained by the following equation 4:

$n(m, n) = (N(m, n) - N(m_0, n_0))/$(predetermined value)    \<Equation 4\>

The noise value of the noise array that corresponds to each pixel can also be computed as the second adjustment value. However, by using the two noise values, a more irregular adjustment value can be obtained and thus, the visual annoyance due to an even distribution of binary values can be reduced more effectively.

Where the grayscale level 'x(m, n)' of the input pixel is below the intermediate grayscale level, through the noise array that corresponds to the region that contains the input pixel (m, n), the noise value 'N(m, n)' corresponding to the input pixel, and a noise value '$N(m_0, n_0)$' corresponding to a black dot nearest to the input pixel (m, n) are detected, respectively, in operation 540. The difference between the two detected noise values is obtained, divided by a predetermined number '8,' added with an opposite sign and determined as the resulting noise value of the input pixel for this case. The determined resulting noise value is computed as the second adjustment value 'n(m,n)' for adjusting the threshold 'T(m, n)' in operation 550.

As described above, according to the binary value determination result based on the grayscale level 'x(m, n)' of the input pixel, the second adjustment value has one or the other sign. With the second adjustment value 'n(m, n)' computed as above, the annoying patterns caused due to an even and regular arrangement of the black dots or white dots can be reduced.

Next, referring back to FIG. 3, the third adjustment value 'd(m, n)' is computed in operation 340. That is, in the binary output device, after the second adjustment value 'n(m, n)' applied with the noise array is computed in the operation 330, the diagonal line pattern detection unit 130 computes the third adjustment value 'd(m, n)' to prevent the occurrence of a diagonal pattern of earlier pixels due to the binarization of the input pixel (m,n) in the operation 340.

The operation of computing the third adjustment value 'd(m, n)' will be described in detail below with reference to FIGS. 6A, 6B and 7.

Figure 7:
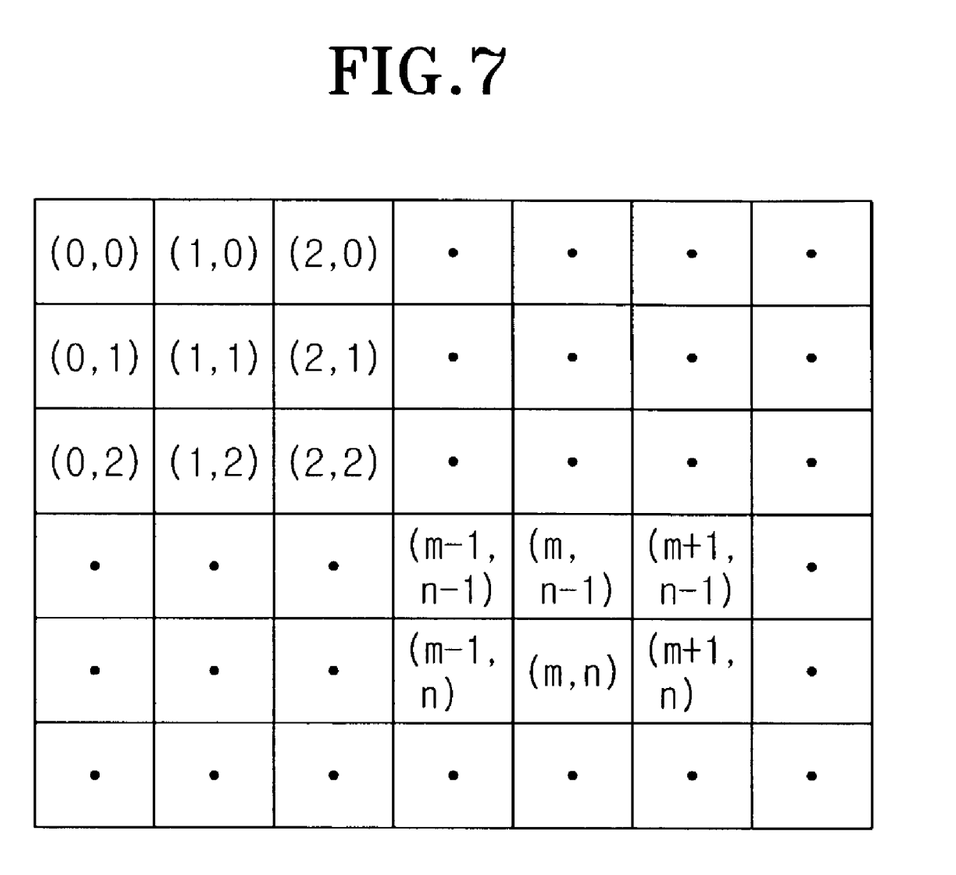
FIG. 7 is a view showing the example of coordinate values of an input image of FIG. 2.

FIG. 7 illustrates an image with its coordinates as shown.

Figure 6A:
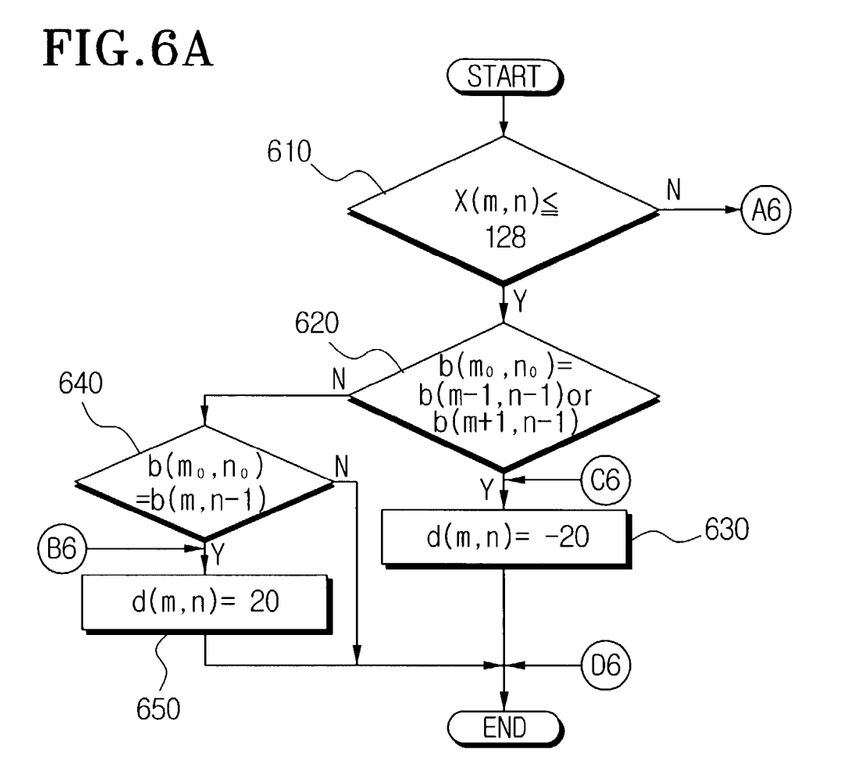
FIGS. 6A and 6B are flowcharts illustrating an operation of computing a third adjustment value of the threshold of FIG. 3

Referring to FIG. 6A, with reference to FIG. 7, where the grayscale level 'x(m, n)' of the input pixel is equal to, or below the intermediate grayscale level '128' in operation 610, the diagonal line pattern detection unit 130 determines whether the pixel $(m_0, n_0)$, which is nearest to the input pixel (m, n) and is binarized into a black dot, is in the left or right diagonal position (m−1,n−1) or (m+1,n+1) in operation 620.

Where one of the two pixels is binarized into a black dot in the diagonal position, the current grayscale level will cause the diagonal pattern. In order to prevent it, the third adjustment value 'd(m, n)' outputs a predetermined adjustment value, for example, '−20' to reduce the threshold 'T(m, n)' of the input pixel in operation 630. It is also determined whether the pixel, which is nearest to the input pixel and binarized into a white dot, is in the perpendicular position (m, n−1) in operation 640. If it is, the third adjustment value 'd(m, n)' outputs another predetermined adjustment value, for example, '20' as shown in operation 650.

Figure 6B:
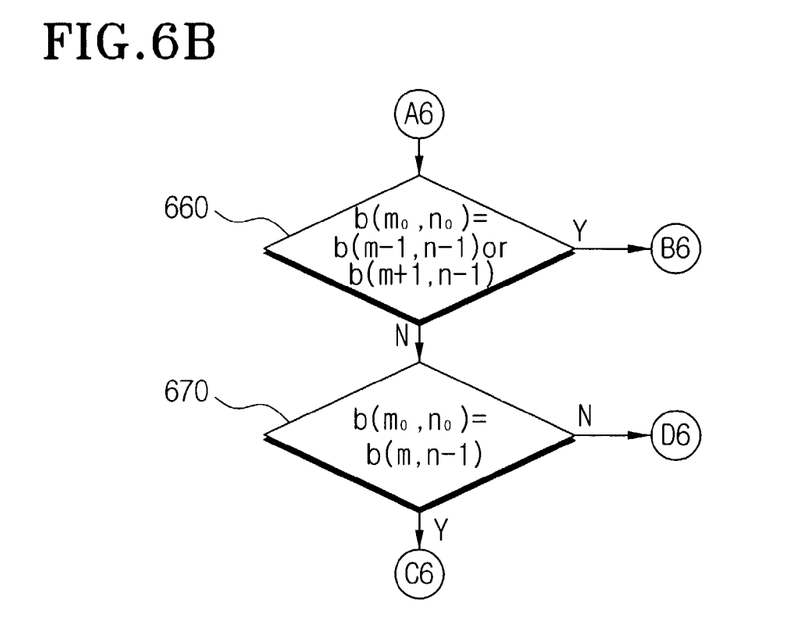

FIG. 6B shows operations performed where it is determined that the grayscale level 'x(m, n)' of the input pixel is above the intermediate grayscale level, i.e., where it is determined that the input pixel is binarized into a white dot. Where the pixel in the diagonal position of the input pixel is binarized into a white dot in operation 660, an adjustment value of '20' is output. Where the pixel in the perpendicular position is binarized into a white dot, the output of the adjustment value corresponds to the value that is output when the input pixel is binarized into a black dot, but with an opposite sign. See reference $D_6$ and $C_6$ of FIGS. 6A and 6B.

With the first, second, and third adjustment values 't(m, n),' 'n(m, n)' and 'd(m, n)' computed as described above, the threshold 'T(m, n)' is adjusted to determine the binary value 'b(m, n)' of the input pixel in operation 350 of FIG. 3. The threshold 'T(m, n)' is obtained by the following equation 5:

$$T(m,n)=128+t(m, n)+n(m,n)+d(m,n)$$ <Equation 5>

After adjusting the threshold 'T(m, n)' of the input pixel with the first, second and third adjustment values 't(m, n),' 'n(m, n)' and 'd(m, n)' in the operation 350, the grayscale level of the input pixel is compared with the adjusted threshold 'T(m, n)' in operation 360. According to the comparison result, the input pixel is determined to be binarized into a black dot or a white dot in operation 370. Such a determined binary value of the input pixel is stored together with respective positions so that a distance can be calculated for the following input pixels in operation 380. For a minimum use of a memory that stores the binary values, a position storage lookup table is employed.

The position storage lookup table minimizes a required memory volume because it converts two-dimensional position information into one-dimensional information. That is, the position storage lookup table separates information about y-axis from x-axis and stores them separately. Table 1 below shows an example of y-axis information of the binarized pixel being stored in the position lookup table.

TABLE 1

| 3 | 5 | −2 | 7 | 1 | 7 | −3 | ... | 7 | −3 | 7 | 1 |

Table 1 shows the number of pixels that are continuously generated on an upper line of a currently binarized pixel. For example, the number '3' in the Table 1 means that there are three continuous white dots in a perpendicular direction in an immediate upper line, and the number '−2' means that there are two continuous black dots being generated. Since this system does not employ a two-dimensional memory but employs a one-dimensional memory instead, the positions of small numbers nearest to the upper line in y-axis are coded and stored effectively. The positions of binarized pixels in the same line as an input pixel with respect to x-axis can also be stored by the same method.

Referring again to FIG. 3, after the binary value 'b(m, n)' of the input pixel is stored in the operation 380, an error value 'e(m, n),' i.e., the difference between the grayscale level 'x(m, n)' of the input pixel and the binary value 'b(m, n),' is calculated in operation 390. Then by diffusing the calculated error value 'e(m, n)' to the neighboring pixels based on the error diffusion coefficient 'w(k, l),' the grayscale levels of the neighboring pixels are corrected in operation 400.

According to the error diffusion processing method of the present invention, black dots or white dots are distributed in an even pattern in a bright region, a dark region and a boundary region between the bright and dark regions, while the irregularity of the noise is applied to increase the quality of the binary output image.

Furthermore, dots by the binary of the input pixel are not arranged in a diagonal pattern. Rather, they are arranged in a perpendicular pattern to reduce a bending phenomenon in a horizontal direction.

It is understood that a system which uses the present invention also includes permanent or removable storage, such as magnetic and optical discs, RAM, ROM, etc., on which the process and data structures of the present invention can be stored and distributed. The operations can also be distributed via, for example, downloading over a network such as the Internet.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An error diffusion processing method of processing an input pixel of an input image to provide a binary image output on a binary output device, the method comprising:
    predicting a type of a dot according to a gray level of the input pixel to be processed;
    searching for a nearest pixel having a dot of the same type as the dot of the input pixel and is nearest to the input pixel;
    computing a first adjustment value of a threshold according to a difference between a measured distance between the input and nearest pixels, and an ideal distance between the input and nearest pixels, wherein the ideal distance is preset according to the gray level;
    computing a second adjustment value of the threshold according to a noise value of the input pixel by applying a noise array to the input image;
    computing a third adjustment value to avoid a diagonal pattern of pixels in response to the nearest pixel having the same dot as the input pixel existing on a diagonal line according to the gray level of the input pixel;
    adjusting the threshold based on the first, the second, and the third adjustment values to determine a binary value of the input pixel;
    determining the binary value of the input pixel by comparing the gray level of the input pixel and the threshold;
    changing the gray level of neighboring pixels by diffusing an error value to the neighboring pixels according to an error distribution coefficient, wherein the error value is a difference between the gray level of the input pixel and the determined binary value of the input pixel; and outputting processed pixels so that the binary image is output on the binary output device.

2. The error diffusion processing method of claim 1, wherein the computing of the first adjustment value comprises:

calculating the measured distance between the input pixel and the nearest pixel having the same dot as the input pixel, based on location values of the input and nearest pixels;

obtaining the ideal distance between the input and nearest pixels by referencing a lookup table which stores the ideal distance between the input and nearest pixels according to the grayscale level;

comparing the obtained ideal distance with the measured distance between the input and nearest pixels; and calculating the first adjustment value according to a weight value based on the comparing of the obtained ideal distance with the measured distance.

3. The error diffusion processing method of claim 1, wherein the computing of the second adjustment value comprises:

dividing the input image into a plurality of regions corresponding to a size of the noise array;

detecting the noise value corresponding to the input pixel from the noise array of the region containing the input pixel, and a nearest noise value of the nearest pixel having the same dot as the input pixel; and computing the second adjustment value according to a difference between the input and nearest noise values.

4. The error diffusion processing method of claim 3, wherein the size of the noise array is 32×32.

5. The error diffusion processing method of claim 3, wherein the second adjustment value n(m, n) satisfies the following relationship in response to the gray level of the input pixel being above an intermediate gray level:

$$n(m, n) = (N(m, n) - N(m_0, n_0))/n_x$$

where the second adjustment value n(m, n) is a threshold value obtained through the noise array of the input pixel, N(m, n) is the noise value corresponding to the input pixel, $n_x$ is a predetermined value, and $N(m_0, n_0)$ is the nearest noise value corresponding to the nearest pixel having the same dot as the input pixel.

6. The error diffusion processing method of claim 5, wherein the second adjustment value satisfies the following relationship in response to the gray level of the input pixel being equal to or below the intermediate gray level:

$$n(m, n) = -\{(N(m, n) - N(m_0, n_0))/n_x\}$$

7. The error diffusion processing method of claim 1, wherein the computing of the third adjustment value comprises:

determining the third adjustment value as a predetermined adjustment value in response to the gray level of the input pixel being equal to or below an intermediate gray level and the binary value of the nearest pixel having the same dot as the input pixel being perpendicular relative to the input pixel, or in response to the gray level of the input pixel being above the intermediate gray level and the binary value of the nearest pixel having the same dot as the input pixel being on the diagonal line relative to the input pixel; and determining the third adjustment value as the predetermined adjustment value with an opposite sign in response to the gray level of the input pixel being equal to or below the intermediate gray level and the binary value of the nearest pixel having the same dot as the input pixel being on the diagonal line relative to the input pixel, or in response to the gray level of the input pixel being above the intermediate gray level and the binary value of the nearest pixel having the same dot as the input pixel being perpendicular relative to the input pixel.

8. The error diffusion processing method of claim 2, wherein the ideal distance between the input and nearest pixels is the reciprocal of an ideal frequency for a binary image of the input image.

9. An error diffusion processing apparatus for changing an input image into a binary image comprising:

a comparator which compares a gray level of an input pixel of the input image with a threshold adjusted by first, second, and third adjustment values to determine a binary value of the input pixel;

an error diffusion unit which diffuses an error value to neighboring pixels according to an error diffusion coefficient, wherein the error value is a difference between the gray level and the binary value of the input pixel;

a distance calculation unit which determines the first adjustment value of the threshold according to a measured distance and an ideal distance between the input pixel and a nearest pixel, wherein the nearest pixel is a pixel having a dot of the same type as and nearest to the input pixel;

a noise compute unit which determines the second adjustment value of the threshold according to a noise value of the input pixel by applying a noise array to the input image; and a diagonal detection unit which determines a third adjustment value of the threshold so as to reduce a diagonal pattern in response to the nearest pixel existing on a diagonal line with respect to the input pixel.

10. The apparatus of claim 9, wherein the input image is a grayscale image.

11. The apparatus of claim 9, wherein the error diffusion processing apparatus obtains a corrected gray level by converting the input pixel according to the error value, and determines the input pixel as one type of a dot in response to the corrected gray level being above the adjusted threshold and determines the input pixel as the other type of the dot in response to the corrected gray level being below the adjusted threshold.

12. The apparatus of claim 9, wherein the error diffusion processing apparatus obtains a corrected gray level by converting the input pixel according to the error value, and determines the input pixel as one type of a dot in response to the corrected gray level being above the adjusted threshold and determines the input pixel as the other type of the dot in response to the corrected gray level being below the adjusted threshold.

13. The apparatus of claim 9, further comprising a look up unit which stores two-dimensional position information of the nearest pixel converted into one-dimensional position information, the ideal distance between the input and nearest pixels, a preset weight for the first adjustment value, and the binary value of the input pixel.

14. A computer readable medium encoded with operating instructions for implementing an error diffusion processing method for processing an input pixel of an input image, performed by a computer, the method comprising:

predicting a type of a dot according to a gray level of the input pixel to be processed;

searching for a nearest pixel having a dot of the same type as the dot of the input pixel and is nearest to the input pixel;

computing a first adjustment value of a threshold according to a difference between a measured distance between the input and nearest pixels, and an ideal distance between the input and nearest pixels, wherein the ideal distance is preset according to the gray level;

computing a second adjustment value of the threshold according to a noise value of the input pixel by applying a noise array to the input image;

computing a third adjustment value to avoid a diagonal pattern of pixels in response to the nearest pixel having the same dot as the input pixel existing on a diagonal line according to the gray level of the input pixel;

adjusting the threshold based on the first, the second, and third adjustment values to determine a binary value of the input pixel;

determining the binary value of the input pixel by comparing the gray level of the input pixel and the threshold; and changing the gray level of neighboring pixels by diffusing an error value to the neighboring pixels according to an error distribution coefficient, wherein the error value is a difference between the gray level of the input pixel and the determined binary value of the input pixel.

15. The computer readable medium of claim 14, wherein the computing of the first adjustment value comprises:

calculating the measured distance between the input pixel and the nearest pixel having the same dot as the input pixel, based on location values of the input and nearest pixels;

obtaining the ideal distance between the input and nearest pixels by referencing a lookup table which stores the ideal distance between the input and nearest pixels according to the grayscale level;

comparing the obtained ideal distance with the measured distance between the input and nearest pixels; and calculating the first adjustment value according to a weight value based on the comparing of the obtained ideal distance with the measured distance.

16. The computer readable medium of claim 14, wherein the computing of the second adjustment value comprises:

dividing the input image into a plurality of regions corresponding to a size of the noise array;

detecting the noise value corresponding to the input pixel from the noise array of the region containing the input pixel, and a nearest noise value of the nearest pixel having the same dot as the input pixel; and computing the second adjustment value according to a difference between the input and nearest noise values.

17. The computer readable medium of claim 16, wherein:

the second adjustment value $n(m, n)$ satisfies the following relationship in response to the gray level of the input pixel being above an intermediate gray level:

$n(m, n) = -(N(m, n) - N(m_o, n_o))/n_x$; and the second adjustment value satisfies the following relationship in response to the gray level of the input pixel being equal to or below the intermediate gray level:

$n(m, n) = -\{(N(m, n) - N(m_o, n_o))/n_x\}$ where the second adjustment value $n(m, n)$ is a threshold value obtained through the noise array of the input pixel, $N(m, n)$ is the noise value corresponding to the input pixel, $n_x$ is a predetermined value, and $N(m_0, n_0)$ is the nearest noise value corresponding to the nearest pixel having the same dot as the input pixel.

18. The computer readable medium of claim 14, wherein the computing of the third adjustment value comprises:

determining the third adjustment value as a predetermined adjustment value in response to the gray level of the input pixel being equal to or below an intermediate gray level and the binary value of the nearest pixel having the same dot as the input pixel being perpendicular relative to the input pixel, or in response to the gray level of the input pixel being above the intermediate gray level and the binary value of the nearest pixel having the same dot as the input pixel being on the diagonal line relative to the input pixel; and determining the third adjustment value as the predetermined adjustment value with an opposite sign in response to the gray level of the input pixel being equal to or below the intermediate gray level and the binary value of the nearest pixel having the same dot as the input pixel being on the diagonal line relative to the input pixel, or in response to the gray level of the input pixel being above the intermediate gray level and the binary value of the nearest pixel having the same dot as the input pixel being perpendicular relative to the input pixel.

19. The computer readable medium of claim 15, wherein the computing of the first adjustment value includes:

inducing the input pixel into one type of the dot in response to the gray level of the input pixel being above an intermediate gray level and the measured distance being greater than the ideal distance, or in response to the gray level of the input pixel being equal to or below the intermediate gray level and the measured distance being less than the ideal distance; and inducing the input pixel into the other type of the dot in response to the gray level of the input pixel being above the intermediate gray level and the measured distance being less than the ideal distance, or in response to the gray level of the input pixel being equal to or below the intermediate gray level and the measured distance being greater than the ideal distance.

20. The error diffusion processing method of claim 1, wherein the binary output device is one of printer, copier, and liquid crystal display.

* * * * *